Dec. 15, 1931.  L. M. WOOLSON  1,836,217
INTERNAL COMBUSTION ENGINE
Filed Sept. 12, 1929  2 Sheets-Sheet 1
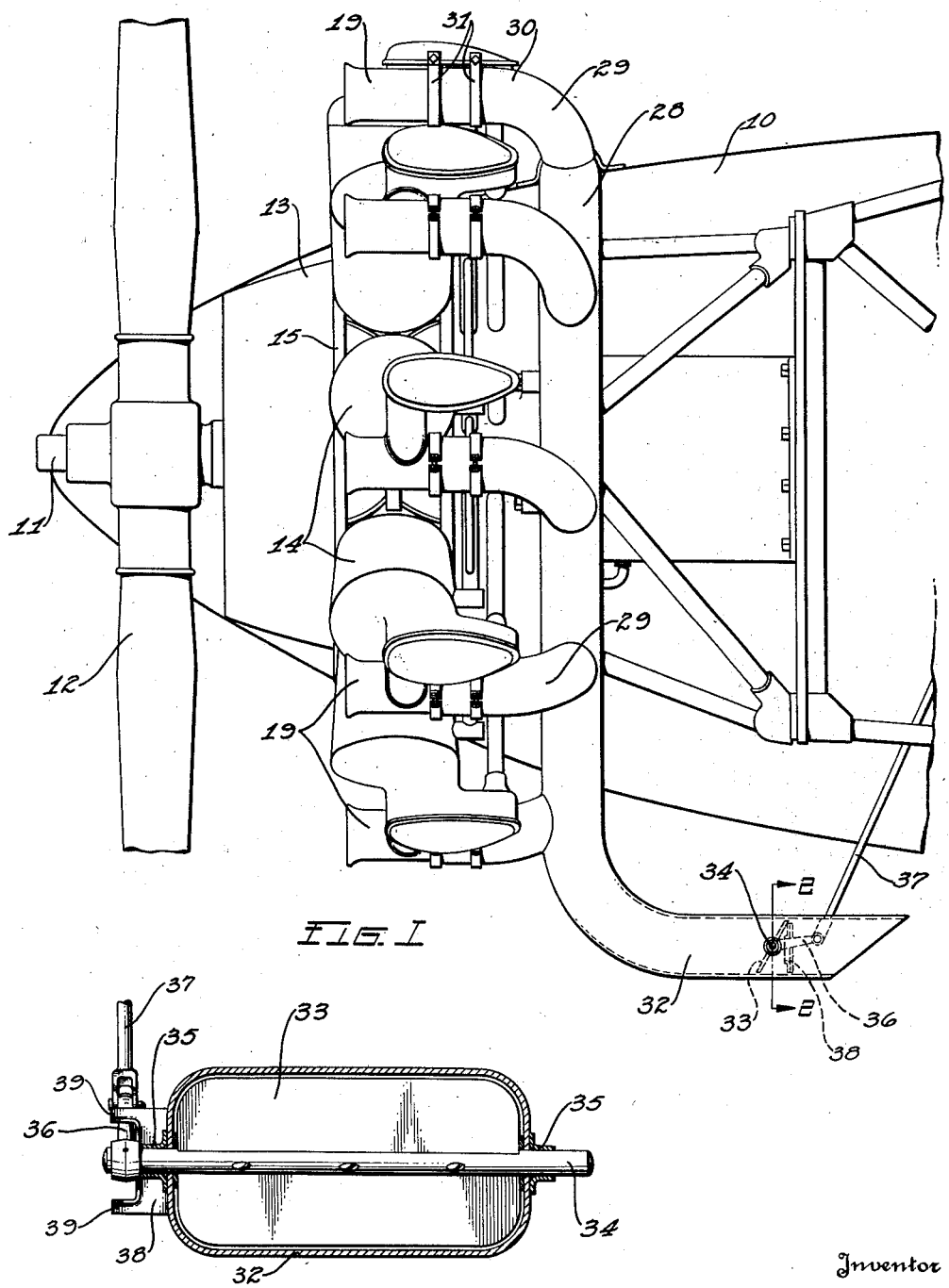
Inventor
LIONEL M. WOOLSON.
By
Attorney Dec. 15, 1931. L. M. WOOLSON 1,836,217
INTERNAL COMBUSTION ENGINE
Filed Sept. 12, 1929   2 Sheets-Sheet 2
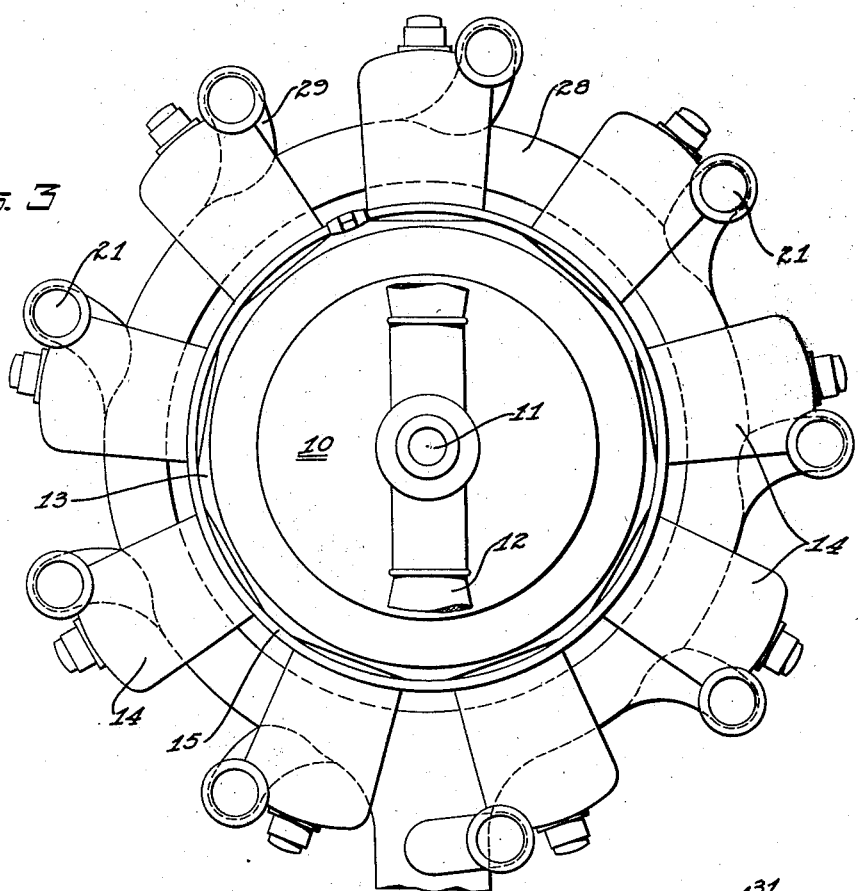
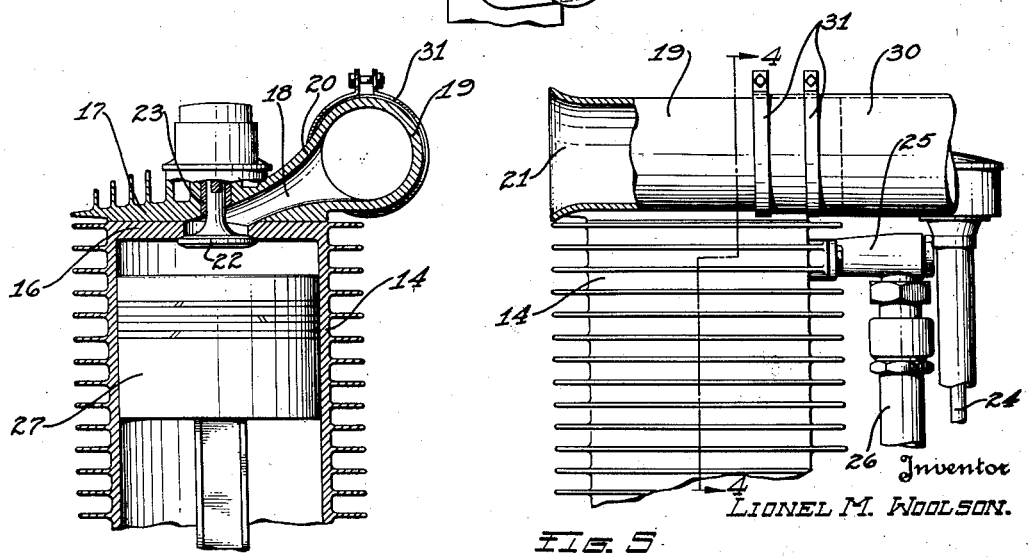
Inventor
LIONEL M. WOOLSON.
By
Attorney Patented Dec. 15, 1931

1,836,217

UNITED STATES PATENT OFFICE

LIONEL M. WOOLSON, OF DETROIT, MICHIGAN, ASSIGNOR TO PACKARD MOTOR CAR COMPANY, OF DETROIT, MICHIGAN, A CORPORATION OF MICHIGAN

INTERNAL COMBUSTION ENGINE

Application filed September 12, 1929. Serial No. 392,210.

This invention relates to internal combustion engines, and more particularly to mechanism for assisting combustion in engines wherein fuel ignition is caused by compression pressure.

In engines of the Diesel type, in which air charges pass directly into the combustion chambers, considerable difficulty is encountered in promoting combustion when starting, and also in bringing in cylinders which have ceased firing when the engine is idling. The incoming air charges tend to reduce the temperature within cylinders which have ceased firing until corresponding to that of the atmosphere surrounding the engine. This cold cylinder condition retards combustion because heat developed by compression of the air charges is required to promote ignition. Temperatures encountered in aeroplane flight are often low, and when a Diesel engine is used as the power plant I have found it very difficult to renew combustion in missing cylinders when idling. As the burden imposed on the cylinders in which combustion is occurring is increased under these circumstances, there is a tendency for the engine to stall, and the danger of this result is obvious.

An object of this invention is to promote the combustion of fuel in the cylinders of a Diesel engine which are not firing.

Another object of this invention is to provide an internal combustion engine in which the exhaust can be utilized to raise the temperature within the cylinders when desired to promote combustion of the fuel charges during operation.

A further object of the invention is to provide an internal combustion engine of the Diesel type in which the cylinders have a single valve for the inlet and exhaust arranged so that either an air charge or a charge comprised of air and exhaust can be drawn into the working chambers during the suction stroke of the pistons.

These and other objects will appear as the following description of the device incorporating my invention progresses.

In the drawings, Fig. 1 is a side elevation of the four parts of an aeroplane having an engine incorporating my invention associated therewith;

Fig. 2 is a sectional view taken on the line 2—2 of Fig. 1, showing the valve arranged within the exhaust outlet pipe;

Fig. 3 is a front elevation of the aeroplane;

Fig. 4 is a sectional view taken on line 4—4 of Fig. 5;

Fig. 5 is a fragmentary side elevation, partially in section, showing one of the engine cylinders.

Referring now to the drawings by characters of reference, 10 represents an aeroplane fuselage structure of a conventional type having an engine incorporating my invention mounted at the forward end thereof and arranged to drive the shaft 11 for rotating the propeller 12.

The engine illustrated is preferably of the radial type and comprises a casing 13 from which a plurality of equally spaced cylinders 14 extend in a radial direction. The cylinder structures extend into the interior of the casing and are secured thereto by compression bands 15. The cylinders are each formed with a head 16 upon which is secured an auxiliary head section 17 and a single passage 18 is arranged to extend through such heads 16 and 17 in a direction tangential to the cylinder and angularly relative to the cylinder axis so that air charges drawn into the cylinder will be directed against the interior of the cylinder walls in a manner to cause rotation in a spiral direction. A conduit 19 extends transversely of, and is preferably formed integrally with, the neck portion 20 of the auxiliary head through which the passage 18 extends. The open mouth 21 of this conduit is preferably arranged so that it faces forwardly in a plane directly behind the propeller, that is, in alignment axially with the air slip stream. A valve 22 is mounted to reciprocate in a bearing 23 so that the head portion thereof will control the inner end of the passage 18, such valve being reciprocated in a desired timed relation with the cycles of operation through suitable mechanism as indicated at 24 which is driven from the crankshaft. A fuel injection device 25 is secured to one side of the cylinder and is arranged to inject atomized liquid fuel under high pressure into the cylinder, such injection device being operated in desired timed relation with the compression stroke through suitable mechanism enclosed by the casing 26 and driven from the crankshaft.

The engine illustrated is of the Diesel type in which fuel and air charges are introduced separately into the working chambers, and the engine operates in a 4-cycle sequence in the usual manner. Air is drawn through the conduit 19 and passage 18 into the cylinder by the suction stroke of the piston 27, and during its compression, preferably before the highest compression, the fuel charge is introduced and is intermingled with the compressed air due to the turbulence created by the rotation of air so that the fuel is equally distributed within the compressed air charge and forms a mixture which is ignited by the compression pressure. It will be understood that in engines of this type, especially those engines which are designed to run at high speeds, a compression pressure of approximately 500 pounds within the cylinder is required for combustion.

When starting an engine of this character, the cylinders are normally "cold" in accordance with the surrounding temperature conditions and consequently when the temperature is high, starting will be much easier than when the temperature is low because of the corresponding heat condition within the cylinders. Under any circumstance, however, starting of a Diesel engine is difficult because of the high compression and the wet fuel charge condition. Considerable effort and force must be employed to turn over the crankshaft, and furthermore, a compression created fuel combustion temperature must be caused by the turning over of the engine. If the engine is idling with some of the cylinders not firing, cold air being drawn into the missing cylinders will tend to create a temperature below that required for ignition of the compressed charge so that combustion will be delayed or prevented.

When an engine of this character is employed as the power plant of an aeroplane, the temperature conditions encountered in flight are generally much lower than at the ground and as it is customary to reduce the fuel charge during gliding, the incoming supply of cold air, which is the same quantity under all fuel feeding conditions, will tend to chill the cylinders so that combustion temperatures will not prevail when the charge is compressed. After a cylinder has once ceased firing under these circumstances, the incoming air is often of a temperature sufficient to chill the cylinder so that the motor may stall because the cylinders which are firing will not develop sufficient power to continue turning over the motor. Under such circumstances, a dangerous situation prevails and it is to overcome such starting and idling conditions, which are present in an engine of this type, that this invention relates.

In order to assist in raising the temperature within the cylinders during idling operation of the engine, I provide mechanism which I will now describe. At the rear of the cylinders is provided a circular manifold 28 having a plurality of extension conduits 29 connected with the rear ends of the conduits 19 by pipes 30, the pipes 30 being preferably of a flexible nature and telescoping the rear open end of the conduits 19 to which they are secured by means of clamps 31. The manifold 28 is provided with an outlet pipe 32 which extends rearwardly from the manifold in a plane beneath the frame of the aeroplane. A valve 33 is provided within the outlet extension 32 and is fixed to a shaft 34 which extends transversely through the exhaust outlet and is rotatably mounted in bearings 35 which are secured to the exhaust outlet pipe. A suitable linkage is connected with the shaft 34 for rotating the same to open and close the valve 33, and such mechanism consists of a link 36 fixed to one end of the shaft 34 and a rod 37 pivotally connected to an end of the link, which rod extends into the cockpit of the aeroplane for manipulation by the pilot.

During starting of the engine, when gliding, or when some of the cylinders are missing, the temperature within the cylinders can be raised by closure of the valve 33. Closure of the valve 33 will shut off escape of exhaust through the manifold outlet, and exhaust gases from cylinders which are firing will escape mainly through the air inlet end of the respective associated conduits 19. A certain portion of the hot exhaust gases will, however, travel into the manifold and out of different conduits than those through which they entered, thereby causing an increase in the temperature of the conduits associated with cylinders not firing and a limited intermingling of the hot gases with the incoming air charges, both conditions tending to raise the temperature of the air charges prior to their entrance in the combustion chamber. In addition, the cold air from the slip stream cannot pass through the manifold and therefore charges entering the conduits become trapped and are reintroduced into the cylinders from the conduits or from the manifold, thereby raising the temperature of the charge prior to entrance into the cylinders. When all of the cylinders are firing, the valve 33 is opened. A bracket 38 is welded, or otherwise secured, to the exhaust manifold outlet 32 and is provided with stop portions 39 projecting therefrom with which the valve actuating link 36 engages to limit the range of its movement.

This device has proven efficient and useful in bringing in the missing cylinder of aeroplane engines of the type described when idling at altitudes where the temperature was approximately zero degrees, and also in assisting the starting of the same.

Various changes can be made in the structure illustrated and described without departing from the spirit of the invention and the scope of the claims.

What I claim is:

1. In a Diesel type engine, the combination of a plurality of cylinders each having a port through which exhaust may pass, a conduit interconnecting said ports and open to the cylinders during the air intake and the exhaust cycles, said conduit having an inlet and an outlet, and means for opening or closing said outlet at will.

2. In an internal combustion engine, the combination of a plurality of cylinders each having a single passage leading to the combustion chamber therein, an exhaust manifold connected with the passages, said exhaust manifold having an outlet, and a valve controlling the passage of exhaust through the outlet.

3. In a Diesel type engine, the combination of a plurality of cylinders, an exhaust manifold communicating with the cylinders during the air intake and exhaust cycles, and means throttling the passage of exhaust from the manifold to aid combustion in cylinders which are not firing.

4. In a Diesel type engine, the combination of a plurality of cylinders each having a common air intake and exhaust passage, means leading from said passages to the atmosphere, an exhaust manifold connected with said passages, and means for closing or opening said manifold directly to atmosphere.

5. In a Diesel type engine, the combination of a plurality of cylinders each having a common air inlet and exhaust passage, a conduit connected with and transversing each passage, an exhaust manifold communicating with each conduit, and means associated with the manifold for causing the exhaust to escape through the air inlet end of the conduits.

6. In a Diesel type engine, the combination of a plurality of cylinders each having a single passage leading to the combustion chamber therein, a conduit disposed transversely of each passage, a manifold connected with one end of each conduit, said manifold having a direct atmospheric port, and a valve for closing said port at will.

7. In a Diesel engine, a plurality of cylinders, an exhaust manifold communicating with the combustion chambers in the cylinders, and means including a manually operable valve for utilizing the manifold to raise the temperature of the air charges prior to introduction into the cylinders.

8. In a Diesel engine, a plurality of cylinders, each of said cylinders having a common air inlet and exhaust outlet passage, an exhaust manifold connected with the cylinder ports and in open communication therewith during the intake of air, and valve means for determining the rate of exhaust flow from the manifold to atmosphere, the position of said valve determining the quantity of exhaust drawn into the cylinders from the manifold by suction during the air intake period.

9. In a Diesel engine, the combination of a plurality of cylinders timed to fire in sequence, interconnected conduits forming an exhaust manifold leading to the cylinders, said manifold structure being open to the interior of the cylinders during the air intake and the exhaust cycles, and control means associated with the manifold structure for either closing or opening the same directly to atmosphere, exhaust being drawn from the conduit structure into the cylinders during the air intake cycles when the control means closes the manifold structure to atmosphere.

10. In a Diesel engine, a plurality of cylinders each having a common passage for the admission of air and the exit of exhaust, and means including a valve operable at will for causing the exhaust from the firing cylinder to be trapped and utilized to promote combustion in the cylinders which are not firing.

11. In a Diesel engine, a plurality of cylinders each having a common passage through which air enters and exhaust leaves, and means including a common manifold associated with the cylinders for causing exhaust to be drawn from the manifold into the combustion chambers with the air charges.

12. In a four-cycle Diesel engine, a plurality of cylinders each having a single passage leading to the combustion chamber therein, an exhaust manifold openly connected with the passages, said exhaust manifold having an outlet, and a valve controlling the passage of exhaust through the outlet, throttling of the outlet causing exhaust to be drawn from the manifold into the cylinders during the suction cycle.

In testimony whereof I affix my signature.

LIONEL M. WOOLSON.